US007204655B2

(12) United States Patent
Tsang et al.

(10) Patent No.: US 7,204,655 B2
(45) Date of Patent: Apr. 17, 2007

(54) SOUND PRODUCING CRAYON

(76) Inventors: Henry Tsang, 52 Major MacKenzie Drive West, Richmond Hill, Ontario (CA) L4C 3S2; Loretana Verrelli, 3535 St. Charles Boulevard, Place Grilli, Suite 303, Kirkland, Montreal, Quebec (CA) H9H 5B9

( * ) Notice: Subject to any disclaimer, the term of this patent is extended or adjusted under 35 U.S.C. 154(b) by 0 days.

(21) Appl. No.: 11/358,994

(22) Filed: Feb. 21, 2006

(65) Prior Publication Data

US 2006/0204317 A1 Sep. 14, 2006

Related U.S. Application Data

(63) Continuation-in-part of application No. 10/774,425, filed on Feb. 10, 2004, now Pat. No. 7,029,192.

(51) Int. Cl.
*B43K 29/00* (2006.01)
*G09B 11/00* (2006.01)
*G09B 11/10* (2006.01)

(52) U.S. Cl. ........................... 401/195; 434/81; 434/84

(58) Field of Classification Search .................. 401/52, 401/195, 49; 434/81, 84, 391
See application file for complete search history.

(56) References Cited

U.S. PATENT DOCUMENTS 5,501,601 A * 3/1996 Todokoro et al. ........... 434/169
2004/0180310 A1 9/2004 Lee

* cited by examiner

*Primary Examiner*—David J. Walczak
(74) *Attorney, Agent, or Firm*—Merchant & Gould P.C.

(57) ABSTRACT

A hand-held sound-emitting writing instrument comprising a writing portion and a sound-producing portion for attachment to the writing portion. The writing portion comprising a marking end for marking a surface and a first connector located opposite the marking end, the first connector comprising an identifying termination. The sound-producing portion comprising a second connector releasably connectable to the first connector and a sound-producing unit for playing a sound recording associated with the writing portion. Wherein the connection of the first and second connectors enables the sound-producing unit to communicate with the identifying termination.

25 Claims, 5 Drawing Sheets

SOUND PRODUCING CRAYON

This application is a Continuation-in-part of U.S. patent application Ser. No. 10/774,425, filed on Feb. 10, 2004, now U.S. Pat. No. 7,029,192, and which application(s) are incorporated herein by reference.

FIELD OF THE INVENTION

This invention relates to crayons of the kind used by children to draw pictures and commonly made of coloured wax material and to other such writing instruments.

BACKGROUND OF THE INVENTION

It has been observed that young children will often draw pictures using a single colour without any apparent selection of the colour or any apparent discrimination between colours. For example, an entire person might be drawn using the colour green. Thus the head, legs, body and arms are all drawn in the colour green. At early stages of development, a child will not associate the colour blue with the sky, the colour yellow with a banana or the colour red with strawberries. The colour of the crayon selected by the child to draw a picture has no apparent significance or relationship to the objects being drawn even when the child has a full box of crayons of varying shades and colours available.

An object of this invention is to provide audible means for discriminating between crayons having different colours.

SUMMARY OF THE INVENTION

In accordance with this invention, there is provided a set of crayons each having at least one characterizing physical property which differs from other crayons in the set. The physical property may, for example, be a colour, size, shape, or fragrance. Each crayon has an identifying termination corresponding to said at least one characterizing physical property and a universal decoder is provided in a sound emitting device which is adapted to produce an audible tone or message that corresponds to the said at least one characterizing property.

Preferably the sound emitting device will include an integrated circuit, microprocessor and speaker components. The sound emitting device may be integral with the crayon. Preferably, the sound emitting device is separable from the crayons and may be physically or electrically coupled to a crayon by the user when a crayon is selected in order for the universal decoder to operate. Alternatively, a sound emitting device is provided which is operational when remote from a selected crayon.

In accordance with another aspect of the present invention, a hand-held sound-emitting writing instrument is provided comprising a writing portion and a sound-producing portion for attachment to the writing portion. The writing portion comprising a marking end for marking a surface and a first connector located opposite the marking end, the first connector comprising an identifying termination. The sound-producing portion comprising a second connector releasably connectable to the first connector and a sound-producing unit for playing a sound recording associated with the writing portion. Wherein the connection of the first and second connectors enables the sound-producing unit to communicate with the identifying termination.

In accordance with yet another aspect of the present invention, a combination of a plurality of writing portions and a sound-producing portion is provided, wherein each of the plurality of writing portions comprises a marking end for marking a surface and a first connector located opposite the marking end and comprising an identifying termination. The sound-producing portion is attachable to any of the plurality of writing portions and comprises a second connector for releasably connecting to the first connector of a one of the plurality of writing portions and a sound-producing unit for playing a sound recording associated with the one of the plurality of writing portions. Wherein the connection of the first connector of the one of the plurality of writing portions and the second connector enabling the sound-producing unit to communicate with the identifying termination of the one of the plurality of writing portion.

In accordance with a further aspect of the present invention, a kit comprising a plurality of writing portions and a sound-producing portion is provided, wherein each of the plurality of writing portions comprises a marking end for marking a surface and a first connector located opposite the marking end and comprising an identifying termination. The sound-producing portion is attachable to any of the plurality of writing portions and comprises a second connector for releasably connecting to the first connector of a one of the plurality of writing portions and a sound-producing unit for playing a sound recording associated with the one of the plurality of writing portions. Wherein the connection of the first connector of the one of the plurality of writing portions and the second connector enabling the sound-producing unit to communicate with the identifying termination of the one of the plurality of writing portion.

BRIEF DESCRIPTION OF THE DRAWINGS

In order that the invention may be more clearly understood, reference will be made to the accompanying drawings, in which:

FIG. 1(*b*) is a perspective view of the assembly of FIG. 1(*a*);

FIG. 3(*b*) is an exploded view of a crayon and sound emitting device assembly according to a second embodiment of the invention;

FIG. 4(*b*) is an exploded view of a crayon and sound emitting device assembly according to a third embodiment of the invention.

FIG. 5(*b*) is an exploded view of a crayon and sound-producing device assembly according to a fourth embodiment of the invention.

DESCRIPTION OF PREFERRED EMBODIMENT WITH REFERENCE TO DRAWINGS

Figure 1:
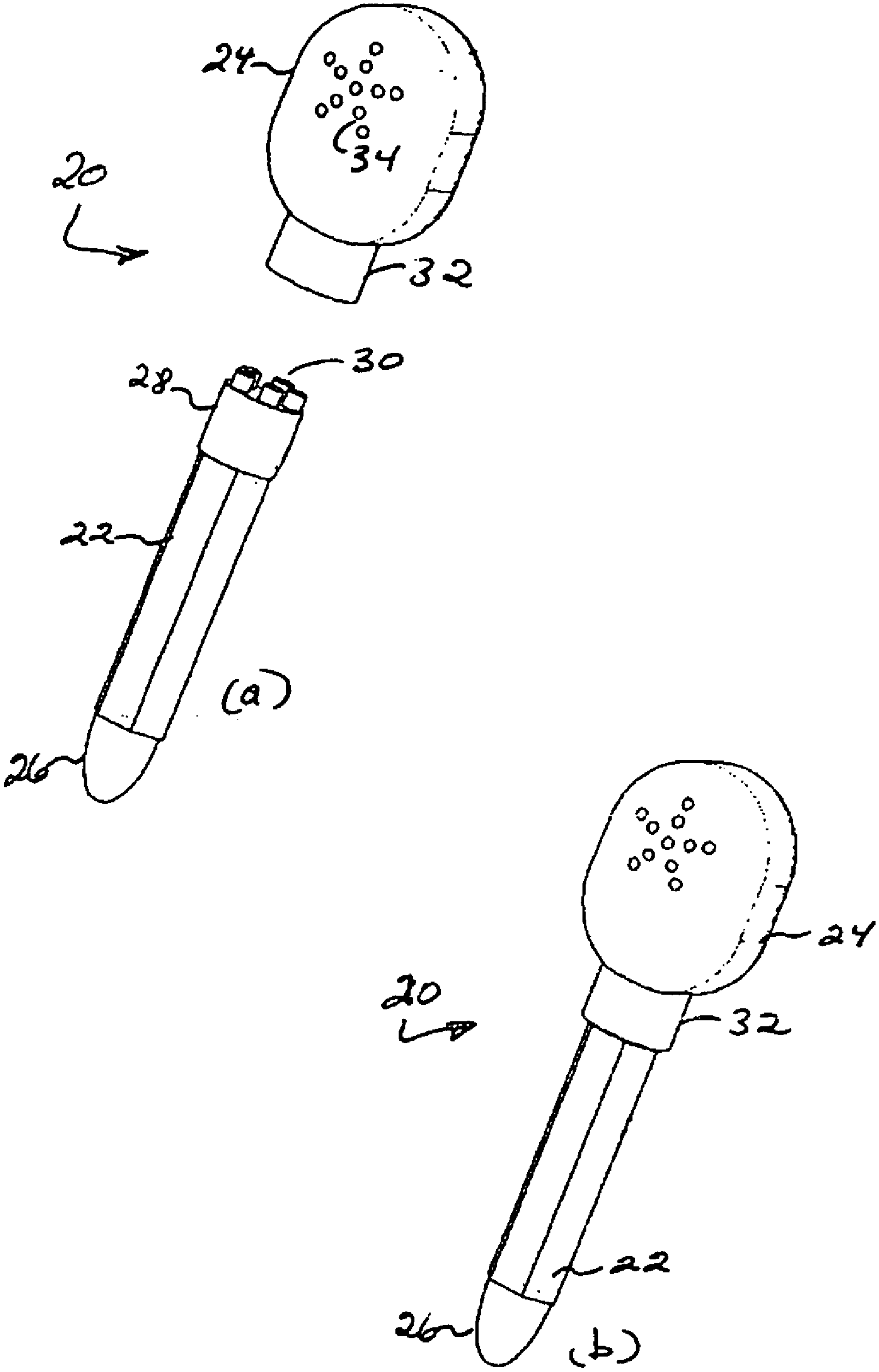
FIG. 1(*a*) is an exploded view of a crayon and sound emitting device assembly according to a first embodiment of the invention.

A first embodiment of a crayon and sound emitting device assembly is generally indicated by reference numeral 20 in FIGS. 1(*a*) and 1(*b*). The assembly 20 consists of a crayon 22 and sound emitting device 24. The crayon 22 has a distal marking end 26 remote from the sound emitting device 24 which is adapted to mark paper (not shown) with a particular colour, for example, red. The crayon 22 has an identifying termination 28 at an end opposite from the distal marking end 26 consisting of a plurality of projecting knobs 30. The identifying termination 28 is adapted to be received inside a socket 32 forming part of the sound emitting device 24 where the knobs 30 trigger a corresponding array of built in switches (not shown) inside the sound emitting device.

The sound emitting device 24 has a speaker 34 operatively connected to a microprocessor and an integrated circuit (not shown) which are housed inside the sound emitting device. The array of switches triggered by the identifying termination 28 operates to produce an audible message associated with the colour red which is transmitted through the speaker 34.

Figure 2:
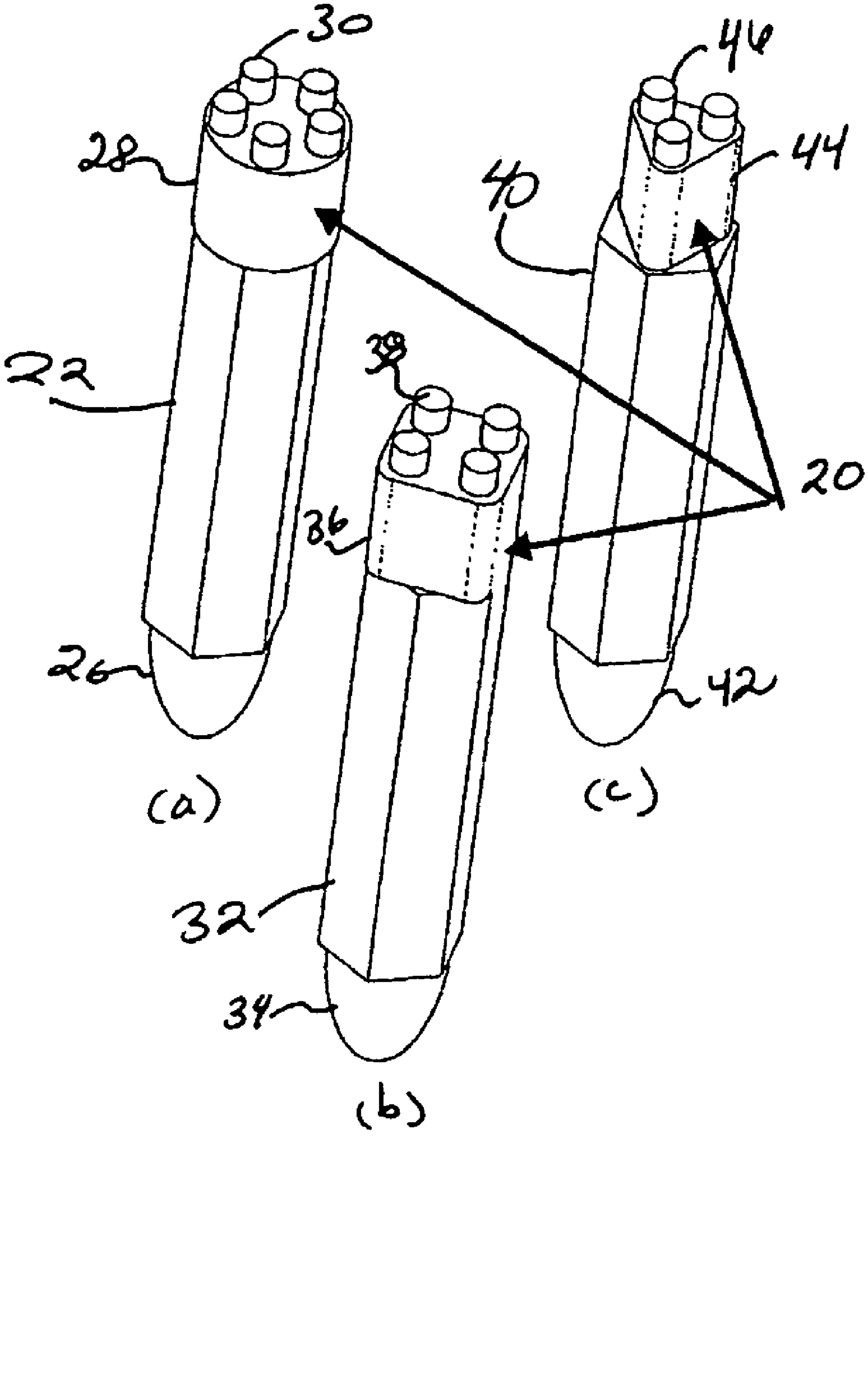
FIG. 2(*a*)(*b*)(*c*) is a perspective view of three crayons each having a respective identifying physical termination in accordance with a first embodiment of the invention.

The identifying termination 28 of the crayon 22 of FIG. 1 has a round base supporting a circular array of five knobs 30 also shown in FIG. 2(*a*).

In FIG. 2(*b*), a crayon 32 having a distal marking end 34 adapted to mark paper (not shown) with the colour blue has an identifying termination 36 with a square base supporting a square array of four knobs 38.

In FIG. 2(*c*), a crayon 40 having a distal marking end 42 adapted to mark paper (not shown) with the colour yellow has an identifying termination 44 with a triangular base supporting a triangular array consisting of three knobs 46.

It will be understood that a universal sound emitting device 24 is physically coupled to a selected crayon and that the nature of the audible message which is transmitted through the speaker 34 is determined by the array of switches inside the sound emitting device 24 which is triggered by the particular identifying termination (28, 36, 44) of the crayon (22, 32, 40) which is being coupled to the sound emitting device 24.

The universal sound-emitting device 24 may be moved from crayon to crayon or each crayon may be coupled to a respective sound emitting device. Optionally, the sound emitting device is integral with the crayon.

Figure 3:
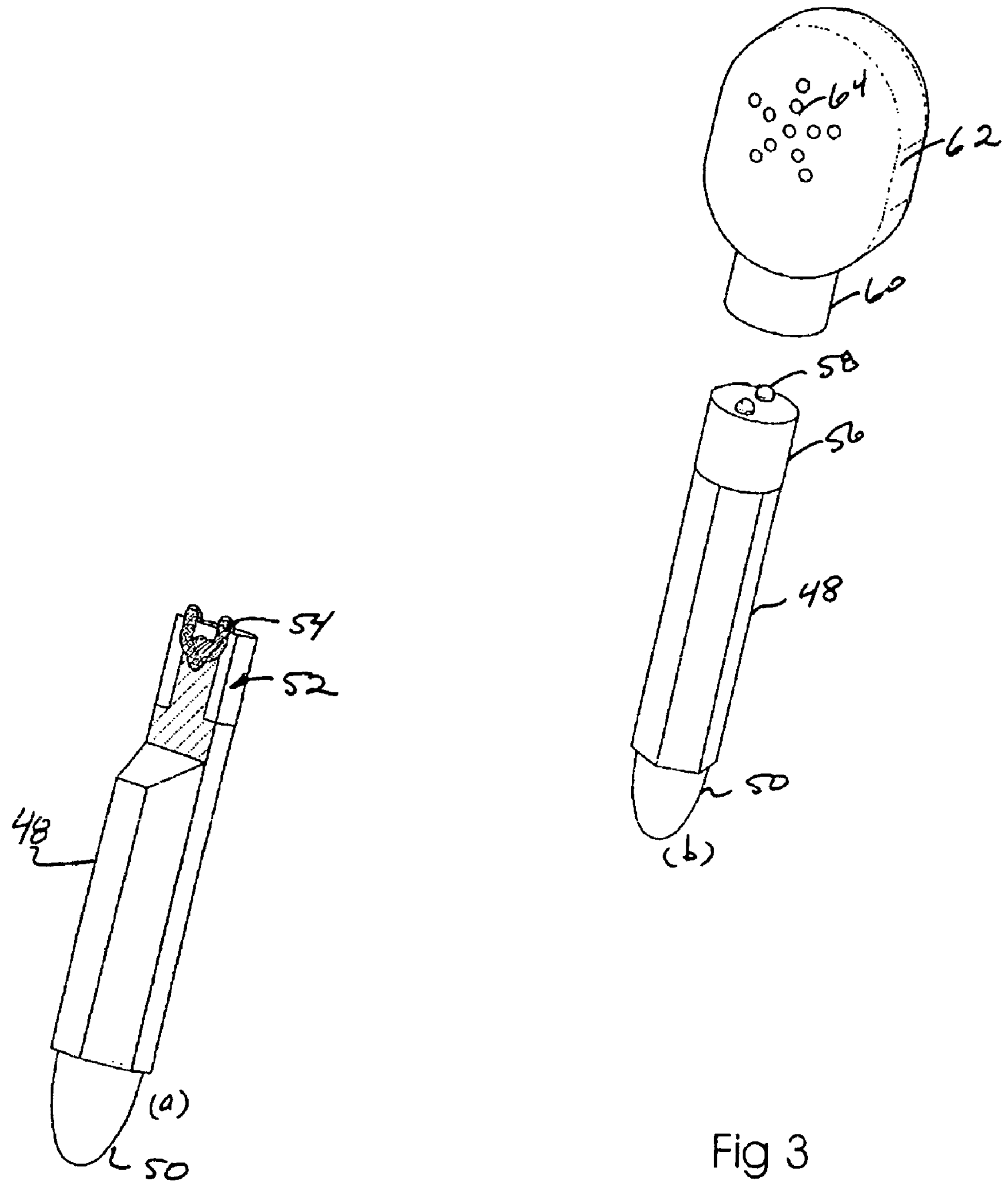
FIG. 3(*a*) is a perspective view of a crayon showing an identifying electrical termination in accordance with a second embodiment of the invention.

In a second embodiment of the invention shown in FIGS. 3(*a*) and (*b*), a crayon 48 having a distal marking end 50 has an identifying termination 52 consisting of an electric resistance element 54 of predefined resistance. The resistance of electric resistance elements will differ from crayon to crayon in a set of crayons. The electric resistance element 54 is embedded in a plastics cap 56 which is fused to the crayon 48 and has a pair of electrical contacts 58 which protrude through the cap 56.

The cap 56 is dimensioned to be received in a socket 60 formed at one end of a sound emitting device 62 which houses a speaker 64, a microprocessor and an integrated circuit (not shown). The electrical contacts 58 close an electrical circuit inside the sound emitting device 62 which will produce a predefined audible sound according to the resistance of the electric resistance element 54 inside a crayon.

Figure 4:
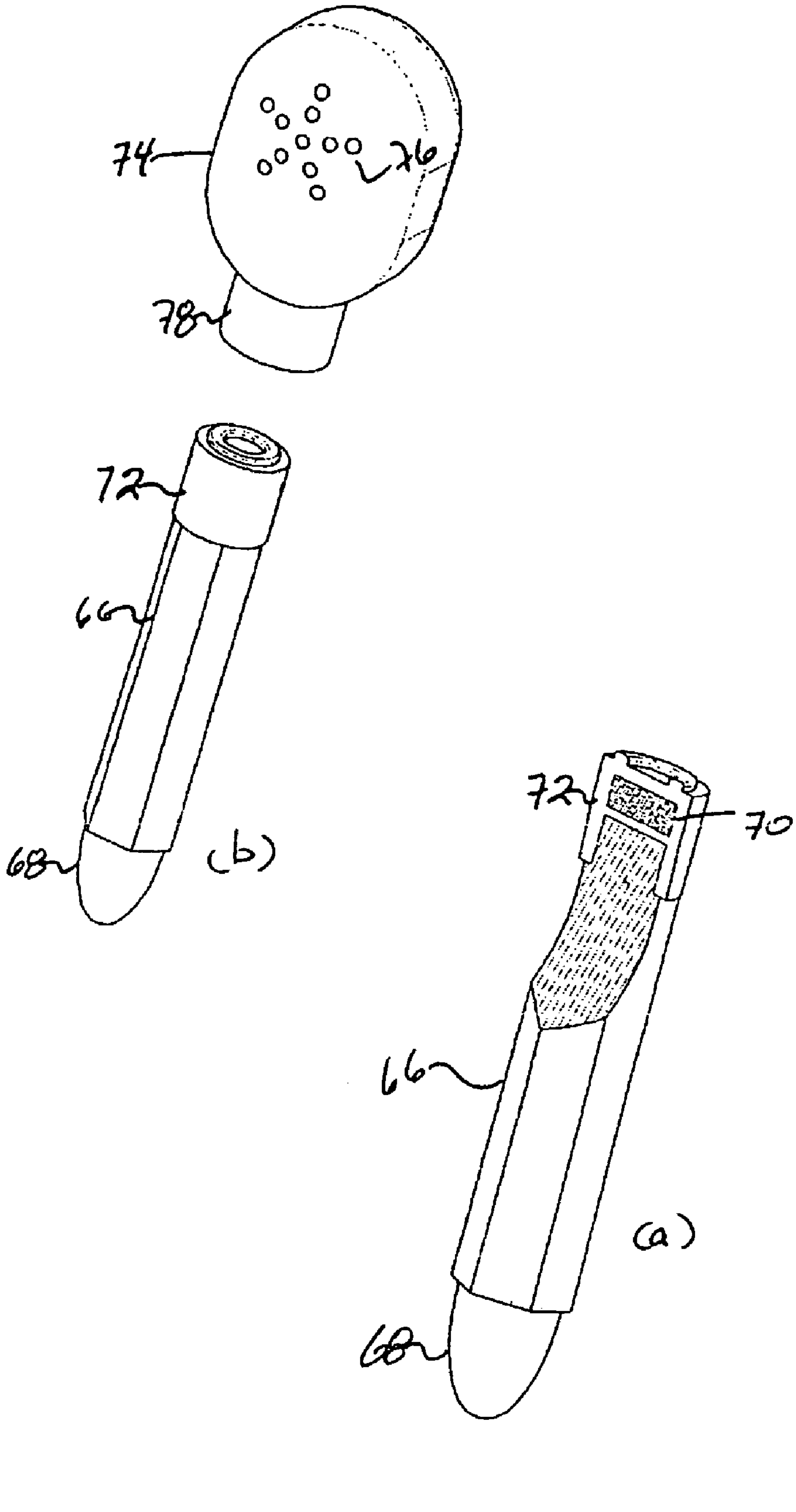
FIG. 4(*a*) is a partly sectioned perspective view of a crayon showing an identifying electromagnetic termination in accordance with a third embodiment of the invention.

In a third embodiment of the invention shown in FIGS. 4(*a*) and (*b*), a crayon 66 having a distal marking end 68 has an identifying termination 70 consisting of a microscopic wave generator which may be an electromagnetic coil or ultrasonic and which is unique to each crayon in a set. The microscopic wave generator is embedded in a plastics cap 72 which is fused to the crayon 66 and which communicates with a sound emitting device 74 which houses a speaker 76, a microprocessor and an integrated circuit (not shown).

Conveniently, the sound emitting device 74 has a socket termination 78 for receiving the identifying termination 70. However, the sound emitting device 74 may be activated without being physically coupled to the crayon 66.

Figure 5:
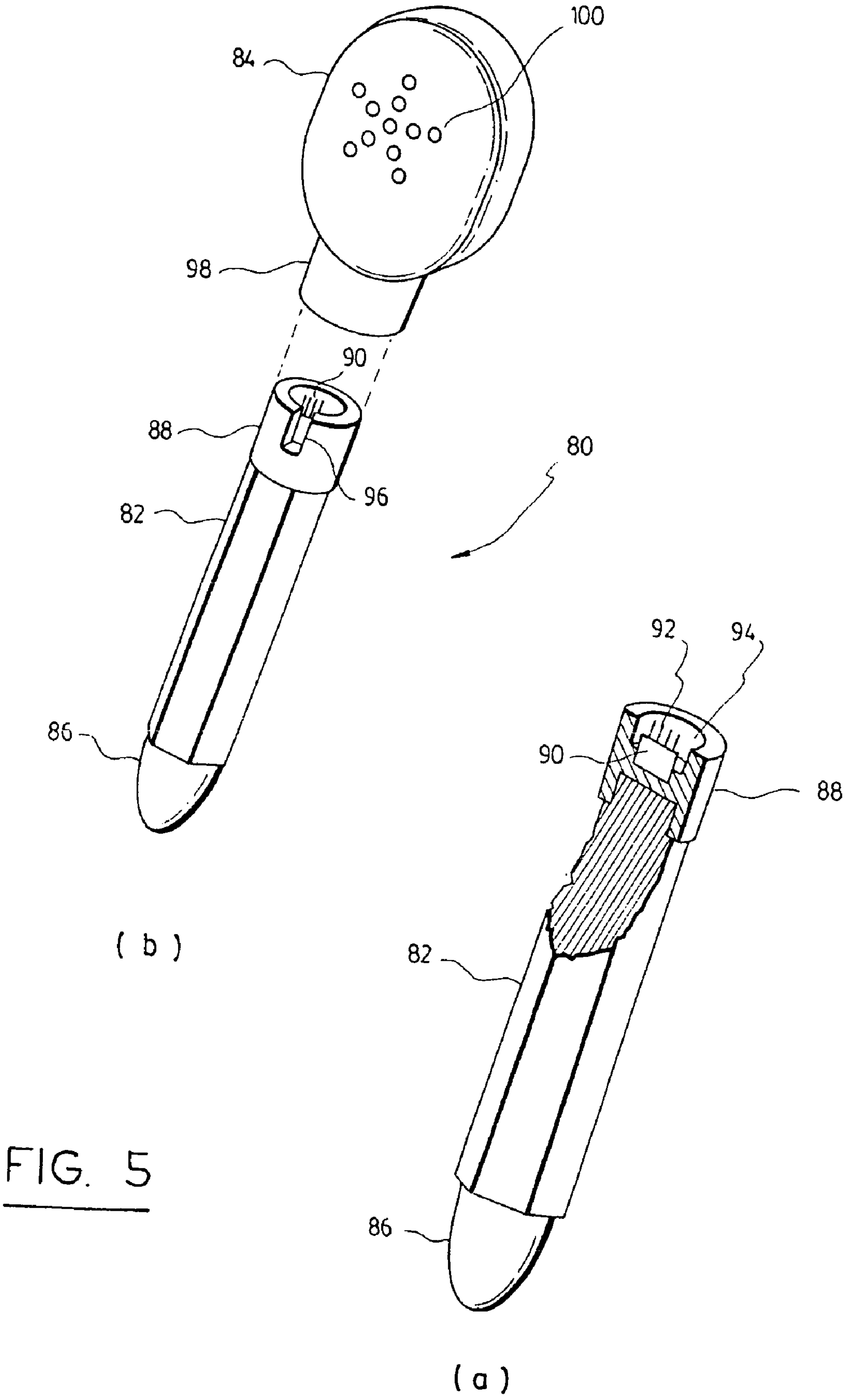
FIG. 5(*a*) is a partly sectioned perspective view of a crayon comprising a pin connector and printed circuit board in accordance with a fourth embodiment of the invention.

In a fourth embodiment of the invention shown in FIGS. 5(*a*) and (*b*), a writing implement 80 comprises a writing portion 82 and a sound-producing portion 84. The writing portion 82 is preferably a wax crayon, but can also be a marker, pen or pencil, as other forms of writing implement are also within the scope of the invention.

Writing portion 82 has a marking end 86 and a connector 88 comprising an identifying termination 90 and a slot 96. Sound-producing portion 84 houses a sound-producing unit 100 and comprises another connector 98, for example a socket, adapted to receive connector 88. Writing portion 82 can be retained in socket 98 in a number of ways, including, but not limited to, by friction fit, clasp or snap.

Within connector 88 and socket 98 are corresponding electrical connectors to allow communication between writing portion 82 and sound-producing portion 84. Identifying termination 90 comprises a plurality of connection points 92, for example pins, projecting from the end opposite to marking end 86. In this embodiment, a four-pin connector is conductively attached by, for example, soldering, to circuit board 94, although other numbers of pins are clearly within the scope of the invention. A subset of pins 92, in this case the first and third, are connected on circuit board 94. This combination serves to identify a characteristic of writing portion 82 to sound-producing portion 84.

When combined, as shown in FIG. 1(*b*), pins 92 engage a mating header (not shown) attached to sound producing unit 100 within sound-producing portion 84. In order to properly align pins 92 and sound-producing unit 100, an inner rib (also not shown) is provided extending longitudinally along an inner surface of socket 98. This rib engages slot 96 so as to angularly align writing portion 82 and sound-producing portion 84 and ensure the proper electrical connection of pins 92 and the mating header.

With the two portions combined, sound-producing portion 84 is operable to identify writing portion 82 by identifying termination 90. With pins 92 in communicative engagement with sound-producing unit 100 via the header housed within portion 84, sound-producing unit 100 is operative to identify the characteristic of writing portion 82, for example the color of marking end 86, by recognising the combination of connected pins 92 on board 94.

With the recognition of writing portion 82, sound-producing unit 100 is enabled to play a sound recording stored inside unit 100. The sound recording can be played automatically upon connection of writing portion 82 and sound-producing portion 84, or in response to a user input, for example the push of a button. Alternatively, the sound recording could be stored on board 94 within writing portion 82 and sound-producing portion 84 is mainly an amplifier and speaker.

The sound recording can comprise music, words, a sound effect or any combination thereof. Preferably, the sound recording is associated with the characteristic of the writing portion detected by unit 100. For example, upon insertion of writing portion 82 into sound-producing portion 84, a sound recording comprising an identification of the color of portion 82 is played. In addition, that color can be spelled and the user instructed to use writing implement 80 in a specific manner.

When a number of writing portions 82 are provided with a sound-producing portion 84 that can recognise each one, a play pattern can be established. Upon assembly with a first writing portion 82, unit 100 plays a recording identifying the color of that portion 82, lists every-day objects associated with that color and instructs the user to draw. Subsequently, the user can be prompted to select another writing portion 82 having a different characteristic and the play pattern continues.

A coloring book can also be provided along with the set of writing portions 82 and sound-producing portion 84. This book can be tailored specifically for use with the sound-producing writing implement 80 and the plurality of colors provided by writing portions 82. The play pattern stored in sound-producing unit 100 can incorporate use of the provided coloring book.

The crayon assembly according to the invention is an educational fun toy which will teach young children how to spell and distinguish their colours. The talking "head" or sound emitting device responds when a crayon is inserted; its "brain" or microprocessor detects what colour it is, says and spells the name and gives an example of common objects normally of that colour. It then prompts the child to draw with that crayon. Preferably, each crayon set comes with one talking "head" and six colourful crayons (blue, green, orange, purple, red and yellow).

It will be understood that several variations may be made to the above-described embodiments of the invention as will be apparent to those skilled in the art.

What is claimed is:

1. A hand-held sound-emitting writing instrument operable to be held in the hand of a user while marking a surface, the instrument comprising:
- a) a writing portion comprising:
  - i. a marking end for marking the surface; and
  - ii. a first connector located opposite the marking end and comprising an identifying termination;
- b) a sound-producing portion for attachment to the writing portion comprising:
  - i. a second connector releasably connectable to the first connector, the first and second connectors cooperable to retain the sound-producing portion to the writing portion while held in the hand of a user to mark a surface; and
  - ii. a sound-producing unit for playing a sound recording associated with the writing portion;
    the connection of the first and second connectors enabling the sound-producing unit to communicate with the identifying termination.

2. The hand-held sound-emitting writing instrument of claim 1, wherein the identifying termination identifies a characteristic of the writing portion.

3. The hand-held sound-emitting writing instrument of claim 2, wherein the identifying termination comprises a first electrical connector and the sound-producing unit comprises a second electrical connector; the first and second electrical connectors being complementary and enabling an electrical connection when the writing and sound-producing portions are attached.

4. The hand-held sound-emitting writing instrument of claim 3, wherein the first and second electrical connectors each comprise a plurality of corresponding connection points.

5. The hand-held sound-emitting writing instrument of claim 4, wherein a subset of the plurality of connection points of the first electrical connector are connected; the subset operative to identify the characteristic to the sound-producing unit.

6. The hand-held sound-emitting writing instrument of claim 4, wherein the plurality of connection points of the first electrical connector are pins and the plurality of connection points of the second electrical connector from a complementary header for receiving the pins.

7. The hand-held sound-emitting writing instrument of claim 2, wherein the characteristic of the writing portion is the color of the marking end.

8. The hand-held sound-emitting writing instrument of claim 7, wherein a sound recording played by the sound-producing portion comprises an identification of the color of the marking end.

9. The hand-held sound-emitting writing instrument of claim 1, wherein the second connector is a socket which receives the first connector.

10. The hand-held sound-emitting writing instrument of claim 9, wherein the first connector is frictionally retained in the socket.

11. The hand-held sound-emitting writing instrument of claim 10, wherein the socket comprises an inner rib extending along an inner surface and the first connector comprises a corresponding slot; the rib and slot cooperating to angularly align the writing portion relative to the sound-producing portion when connected.

12. The combination of a plurality of writing portions and a sound-producing portion, the combination of one of the writing portions and the sound producing portion operable to be held in the hand of a user while marking a surface, wherein:
- a) each of the plurality of writing portions comprises:
  - i. a marking end for marking the surface; and
  - ii. a first connector located opposite the marking end and comprising an identifying termination;
- b) the sound-producing portion is attachable to any of the plurality of writing portions and comprises:
  - i. a second connector for releasably connecting to the first connector of a one of the plurality of writing portions, the first connector of the one of the plurality of writing portions and second connector cooperable to retain the sound-producing portion to the one of the plurality of writing portions while held in the hand of a user to mark a surface; and
  - ii. a sound-producing unit for playing a sound recording associated with the one of the plurality of writing portions;

the connection of the first connector of the one of the plurality of writing portions and the second connector enabling the sound-producing unit to communicate with the identifying termination of the one of the plurality of writing portions.

13. The combination of claim 12, wherein each of the plurality of identifying terminations identifies a characteristic of the respective writing portion.

14. The combination of claim 13, wherein the characteristic associated with each of the plurality of writing portions is the color of each respective marking end.

15. The combination of claim 14, wherein a sound recording played by the sound-producing portion comprises an identification of the color of the marking end of the one of the plurality of writing portions.

16. The combination of claim 15, wherein a sound recording played by the sound-producing portion further comprises an instruction to a user to attach another one of the plurality of writing portions.

17. The combination of claim 15, wherein the combination further comprises a coloring book and the sound recording further comprises instructions associated with the coloring book.

18. The combination of claim 13, wherein each identifying termination comprises a first electrical connector and the sound-producing unit comprises a second electrical connector; the second electrical connector being complementary with each first electrical connector thereby enabling an electrical connection to with the one of the plurality of writing portions and sound-producing portion are attached.

19. The combination of claim 18, wherein each of the first electrical connectors comprises a first plurality of connection points and the second electrical connector comprises a corresponding second plurality of connection points.

20. The combination of claim 19, wherein a subset of each first plurality of connection points are connected; each subset operative to identify the characteristic of the respective writing portion; each subset being recognizable by the sound-producing unit.

21. The combination of claim 20, wherein each first plurality of connection points are pins and each second plurality of connection points form a complementary header for receiving the pins of the one of the plurality of writing portions.

22. The combination of claim 12, wherein the sound-producing portion electronically stores a plurality of sound recordings, each one of the plurality of sound recordings associated with a respective one of the plurality of writing portions.

23. The combination of claim 12, wherein each identifying termination stores a sound recording associated with its respective writing portion.

24. A kit for forming a hand-held sound-emitting writing instrument operable to be held in the hand of a user while marking a surface, the kit comprising a plurality of writing portions and a sound-producing portion, wherein:

a) each of the plurality of writing portions comprises:

i. a marking end for marking the surface; and ii. a first connector located opposite the marking end and comprising an identifying termination;

b) the sound-producing portion is attachable to any of the plurality of writing portions and comprises;

i. a second connector for releasably connecting to the first connector of a one of the plurality of writing portions, the first connector of the one of the plurality of writing portions and the second connector cooperable to retain the sound-producing portion to the one of the plurality of writing portions while held in the hand of a user to mark a surface; and ii. a sound-producing unit for playing a sound recording associated with the one of the plurality of writing portions;

the connection of the first connector of the one of the plurality of writing portions and the second connector enabling the sound-producing unit to communicate with the identifying termination of the one of the plurality of writing portion.

25. The kit of claim 24, whcrcin the kit further comprises a coloring book.

* * * * *